United States Patent [19]

Labrousse et al.

[11] Patent Number: 5,313,551
[45] Date of Patent: May 17, 1994

[54] MULTIPORT MEMORY BYPASS UNDER SOFTWARE CONTROL

[75] Inventors: Jean-Michel J. Labrousse, Palo Alto; Gerrit A. Slavenburg, Mt. View, both of Calif.

[73] Assignee: North American Philips Corporation, New York, N.Y.

[21] Appl. No.: 654,847

[22] Filed: Feb. 11, 1991

Related U.S. Application Data

[63] Continuation-in-part of Ser. No. 594,534, Oct. 5, 1990, abandoned, which is a continuation-in-part of Ser. No. 290,979, Dec. 28, 1988, abandoned.

[51] Int. Cl.$^5$ .................... G06F 12/00; G06F 9/00
[52] U.S. Cl. .................... 395/425; 395/375; 395/500; 395/400; 395/DIG. 1
[58] Field of Search ............ 395/500, 800, 375, 400, 395/425

[56] References Cited

U.S. PATENT DOCUMENTS

| | | | |
|---|---|---|---|
| 4,535,428 | 8/1985 | Furman | 365/230.05 |
| 4,573,116 | 2/1986 | Ong et al. | 364/400 |
| 4,599,708 | 7/1986 | Schuster | 365/174 |
| 4,719,596 | 1/1988 | Bernstein et al. | 365/189 |
| 4,811,296 | 3/1989 | Garde | 365/189.02 |
| 4,862,347 | 8/1989 | Rudy | 395/500 |
| 5,123,097 | 6/1992 | Joyce et al. | 395/375 |

FOREIGN PATENT DOCUMENTS 62-287498 12/1987 Japan .

OTHER PUBLICATIONS

R. P. Colwell et al: 'A VLIW Architecture for a Trace Scheduling Compiler', Proc. ASPLOS II at Palo Alto, Calif., Oct. 5-8, pp. 180-192.

J. Labrousse and G. Slavenburg: 'CREATE-LIFE: A Design System for High Performances VLSI Circuits', Proc. IEEE International Conference on Computer Design, Oct. 3-5, 1988.

"Multi-Port Asymmetric Memory Cell", Joy et al. IBM Tech. Disclosure Bulletin vol. 23, No. 7A Dec. 1980.

"Allocation of Multiport Memories in Data Path Synthesis" Balakrishnan et al, IEEE Compt., Apr. 1988.

"Single/Multiport Memory Synthesis in Data Path Design" Chen et al., IEEE Compt. 1990.

*Primary Examiner*—Parshotam S. Lall
*Assistant Examiner*—Viet Vu
*Attorney, Agent, or Firm*—Anne E. Barschall

[57] ABSTRACT

A program-controlled processing device includes a multiport memory circuit providing a plurality of storage locations. First and second data ports of the memory circuit provide parallel access to different locations in accordance with first and second addresses encoded in the program instructions. Bypass means is provided for coupling the second data port to the first data port to simulate parallel access to the same location when desired. The bypass means is controlled directly by the program instructions, by means of a separate bypass control field or by a special value of one of the two addresses. There is thus no need for a run-time comparison of addresses before each memory access, leading to a faster operation of the memory circuit.

19 Claims, 6 Drawing Sheets

|     |       |       |       |       |       | DEC.-.-.SE |      |      |      |      |      |      |      |      |      |
| --- | ----- | ----- | ----- | ----- | ----- | ---- | ---- | ---- | ---- | ---- | ---- | ---- | ---- | ---- | ---- |
| Cy  | COC   | ALC   | RGC   | DMC   | BRC   | AL.G | AL.L | AL.R | RG.G | RG.I | DM.G | DM.A | DM.I | BR.G | BR.A |
| 0   | Op005 | —     | Op001 | —     | —     | —    | —    | CO   | —    | —    | —    | —    | —    | —    | —    |
| 1   | Nw015 | Op006 | —     | —     | —     | —    | RG   | —    | —    | —    | —    | —    | —    | —    | CO   |
| 2   | Op002 | Op003 | —     | Op007 | Nw016 | —    | —    | CO   | —    | —    | —    | AL   | —    | —    | —    |
| 3   | Op010 | —     | —     | Op004 | —     | —    | —    | CO   | —    | —    | —    | AL   | —    | —    | —    |
| 4   | —     | Op012 | —     | Op008 | —     | —    | DM   | —    | —    | —    | —    | DM   | —    | —    | —    |
| 5   | —     | Op011 | —     | Op013 | —     | —    | DM   | —    | —    | —    | —    | XX   | —    | —    | —    |
| 6   | —     | —     | —     | Op009 | —     | —    | —    | —    | —    | —    | —    | AL   | DM   | —    | —    |
| 7   | —     | —     | —     | Op014 | —     | —    | —    | —    | —    | —    | —    | —    | DM   | —    | —    |

FIG. 5A

| Cy  | COC   | ALC   | RGC   | DMC   | BRC   | AL.G | AL.L | AL.R | RG.G | RG.I | DM.G | DM.A | DM.I | BR.G | BR.A |
| --- | ----- | ----- | ----- | ----- | ----- | ---- | ---- | ---- | ---- | ---- | ---- | ---- | ---- | ---- | ---- |
| 0   | Op005 | —     | Op001 | —     | —     | —    | —    | CO   | —    | —    | —    | —    | —    | —    | —    |
| 1   | Nw015 | Op006 | —     | —     | —     | —    | RG   | —    | —    | —    | —    | —    | —    | —    | CO   |
| 2   | Op002 | Op003 | —     | Op007 | —     | —    | —    | CO   | —    | —    | —    | AL   | —    | —    | —    |
| 3   | Op010 | —     | —     | —     | Nw016 | —    | —    | CO   | —    | —    | —    | AL   | —    | —    | —    |
| 4   | —     | Op012 | —     | Op004 | —     | —    | —    | DM   | —    | —    | —    | DM   | —    | —    | —    |
| 5   | —     | —     | —     | Op008 | —     | —    | —    | —    | —    | —    | —    | AL   | —    | —    | —    |
| 6   | —     | Op011 | —     | Op013 | —     | —    | DM   | —    | —    | —    | —    | DM   | —    | —    | —    |
| 7   | —     | —     | —     | Op009 | —     | —    | —    | —    | —    | —    | —    | AL   | DM   | —    | —    |
| 8   | —     | —     | —     | Op014 | —     | —    | —    | —    | —    | —    | —    | —    | DM   | —    | —    |

FIG. 5B

| Cy  | COC   | ALC   | RGC   | DMC   | BRC   | AL.G | AL.L | AL.R | RG.G | RG.I | DM.G | DM.A | DM.I | BR.G | BR.A | SP  |
| --- | ----- | ----- | ----- | ----- | ----- | ---- | ---- | ---- | ---- | ---- | ---- | ---- | ---- | ---- | ---- | --- |
| 0   | Op005 | —     | Op001 | —     | —     | —    | —    | CO   | —    | —    | —    | —    | —    | —    | —    | —   |
| 1   | Nw015 | Op006 | —     | —     | —     | —    | RG   | —    | —    | —    | —    | —    | —    | —    | CO   | —   |
| 2   | Op002 | Op003 | —     | Op007 | Nw016 | —    | —    | CO   | —    | —    | —    | AL   | —    | —    | —    | —   |
| 3   | Op010 | —     | —     | Op004 | —     | —    | —    | CO   | —    | —    | —    | AL   | —    | —    | —    | —   |
| 4   | —     | Op012 | —     | Op008 | —     | —    | —    | DM   | —    | —    | —    | DM   | —    | —    | —    | —   |
| 5   | —     | —     | —     | Op013 | —     | —    | —    | DM   | —    | —    | —    | AL   | —    | —    | —    | DM  |
| 6   | —     | Op011 | —     | Op009 | —     | —    | —    | —    | —    | —    | —    | SP   | DM   | —    | —    | —   |
| 7   | —     | —     | —     | Op014 | —     | —    | —    | —    | —    | —    | —    | AL   | DM   | —    | —    | —   |

FIG. 5C

MULTIPORT MEMORY BYPASS UNDER SOFTWARE CONTROL

CROSS-REFERENCES TO RELATED APPLICATIONS

This is a continuation-in-part of a copending U.S. patent application Ser. No. 594,534, filed Oct. 5, 1990 not abandoned, itself a continuation-in-part of copending U.S. patent application Ser. No. 290,979, filed Dec. 28, 1988, now abandoned. The contents of both applications are hereby incorporated by reference.

FIELD OF THE INVENTION

This invention relates to processing devices, methods of operating processing devices, and multiport memory circuits useful for example as high speed register files in processing devices.

The invention relates in particular to a data processing device constructed for operation under control of a sequence of instructions forming a program, the device including:
  storage means including a plurality of storage locations and having at least first and second data ports for providing parallel access to different storage locations in accordance with respective first and second addresses encoded in a first type of program instruction; and
  bypass means responsive to a bypass signal for connecting the second data port to the first data port to simulate parallel access of both data ports to the same storage location.

The invention further relates to a method of operating such a processing device and to a multiport memory circuit comprising:
  an array of storage locations associated with respective address values;
  first and second data ports;
  address decoding means for receiving respective first and second address values and for enabling parallel access via the first and second data ports to respective storage locations in accordance with the received address values; and
  bypass means for connecting the second data port to the first data port, simulating parallel access of both data ports to the same storage location.

DESCRIPTION OF RELATED ART

Multiport memories as such are well known to those skilled in the art, and can be found with various numbers of read ports and write ports, depending on the application. Multiport memories are very demanding of circuit area, but find application particularly within data processing devices as register files, that is to say temporary buffers for the intermediate results and arguments produced and used by the functional elements of the processing device. In this role, the memory circuit finds itself in the so-called critical path of some or even all operations of the processing device. It is therefore important that a value written into a storage location via a write port of the register file is available as soon as possible for reading via a read port of the register file. Ideally, parallel access would be possible to the same location via both (or all) ports simultaneously.

Memory cells are known which allow access via two ports in a single memory cycle, but these generally involve the staggered timing of write and/or read operations within the memory cycle. The circuitry of each cell is therefore more complex and the memory cycle time must be increased to allow for the complex sequence of operation within each cycle.

A known alternative to this approach is to simulate parallel access using bypass circuitry, as described for example in U.S. Pat. No. 4,599,708 (Shuster) and U.S. Pat. No. 4,811,296 (Garde). In the known circuits, the port addresses are compared with one another at run time and equality between two (or more) port addresses activates bypass circuitry to connect one of the ports directly to the other port, while only the latter is connected directly to the memory cell(s) for the addressed location. Thus in Shuster, a read port is connected to a write port while that write port alone is connected to the addressed memory cell(s), under control of, a comparator.

In Garde, bypass from write ports to read ports is referred to as 'flow through', and Garde also illustrates how multiple read ports can be connected to one another when equal addresses are received for two or more of the read ports. The term 'bypass' is used herein to encompass both write-to-read bypass (flow through) and read-to-read bypass, although write-to-read bypass is the primary concern in the exemplary embodiments.

A type of processing device in which multiport register files are the primary means for transferring and buffering results and arguments between processing elements is the 'very long instruction word' (VLIW) type of processor. 'The Ideal VLIW' processor and a practical VLIW processor known as the TRACE processor are described by R. P. Colwell et al in an article entitled 'A VLIW Architecture for a Trace Scheduling Compiler', published in the Proceedings of the Second International Conference on Architectural Support for Programming Languages and Operating Systems (ASPLOS II) at Palo Alto, Calif., Oct. 5–8, 1987, pages 180 to 192.

A video signal processor having a VLIW architecture is described in the copending parent application Ser. No. 290,979 referred to above. In the processing device of Ser. No. 290,979, the multiport memories concerned have one write port and one read port each, and are referred to therein as 'silos'. A similar structure for more general processing devices is described by the present inventors in 'CREATE-LIFE: A Design System for High Performance VLSI Circuits', Proc. IEEE International Conference on Computer Design, Oct. 3–5, 1988, and in the copending parent application No. 594,534. In all of these VLIW processing devices, every processing operation would effectively take one cycle longer if write-read bypassing were not provided in the multiport register files, drastically reducing the processing performance of the device.

Unfortunately, the address comparators not only occupy a sizeable circuit area, they are also part of the critical path in each memory cycle, and so themselves contribute to a longer memory cycle. It may be noted that a comparison of two addresses will always be slower in a given circuit technology than simple address decoding.

SUMMARY OF THE INVENTION

It is an object of the invention to improve the performance of a data processing device which includes one or more high speed multiport register files. It is a further object of the invention to provide an improved multiport memory circuit useful for example as a high speed register file.

According to the invention the bypass signal is explicitly encoded in the program. The instructions controlling the storage means are thus effectively divided into two types, a first type being used when the two data ports are accessing different locations and a second type being used when both ports are accessing the same location. The inventors have recognized that in many classes of processing device, for which the first and second addresses are defined in the program, equality of those addresses in a given cycle can be detected when the program is being generated. With the bypass signal encoded explicitly in the program, the invention can eliminate both the comparator hardware and the time taken for the comparison at run-time, so improving the performance of the processing device.

The first data port may be a write port, while the second data port is a read port of the storage means. The storage means may thus form at least part of a register file for buffering intermediate results between a data output and a data input of a processing element included within the device.

In a first embodiment, the bypass signal is encoded in a bypass control field separate from fields containing the first and second addresses. In a second embodiment the bypass signal is encoded as a special value of one of the address fields, which special value does not correspond to a location accessible via the corresponding data port. The second embodiment is particularly advantageous in a VLIW processor where each instruction word controls many data ports, because each bypass signal does not then add a whole bit to the already long instruction word. There is no additional delay in the critical path, since the address field has to be decoded to access the specified location in any case.

In embodiments of the processing device, one or more processing elements are included which are constructed to operate synchronously with one another and with the storage means under control of respective fields of the program instructions, while the storage means forms at least part of a multiport register file interconnecting respective data inputs and data outputs of at least two of the processing elements.

The invention further provides a method of operating a processing device constructed in accordance with the invention, as set forth above, the method comprising:
defining a desired sequence of operations for the device, including parallel first and second sequences of accesses to locations in the storage means via the first and second data ports respectively;
identifying in the first and second access sequences desired parallel accesses to the same location; and
generating a sequence of instructions for controlling the operation of the device to effect the first and second access sequences, the generated sequence including instructions of the second type referred to above to effect the identified parallel accesses.

The invention yet further provides a multiport memory circuit comprising:
an array of storage locations associated with respective address values;
first and second data ports;
address decoding means for receiving respective first and second address values and for enabling parallel access via the first and second data ports to respective storage locations in accordance with the received address values; and
bypass means for connecting the second data port to the first data port in response to a special value of at least one of the received addresses, simulating parallel access of both data ports to the same storage location.

This novel multiport memory structure can be used for example as a register file to improve the performance of a processing device, as described above.

BRIEF DESCRIPTION OF THE DRAWINGS

Embodiments of the invention will now be described, by way of example, with reference to the accompanying drawings, in which:

FIG. 5 illustrates the scheduling of the first example program fragment for the device of FIG. 1, including the problem of collisions;

DETAILED DESCRIPTION OF THE EMBODIMENTS

Figure 1:
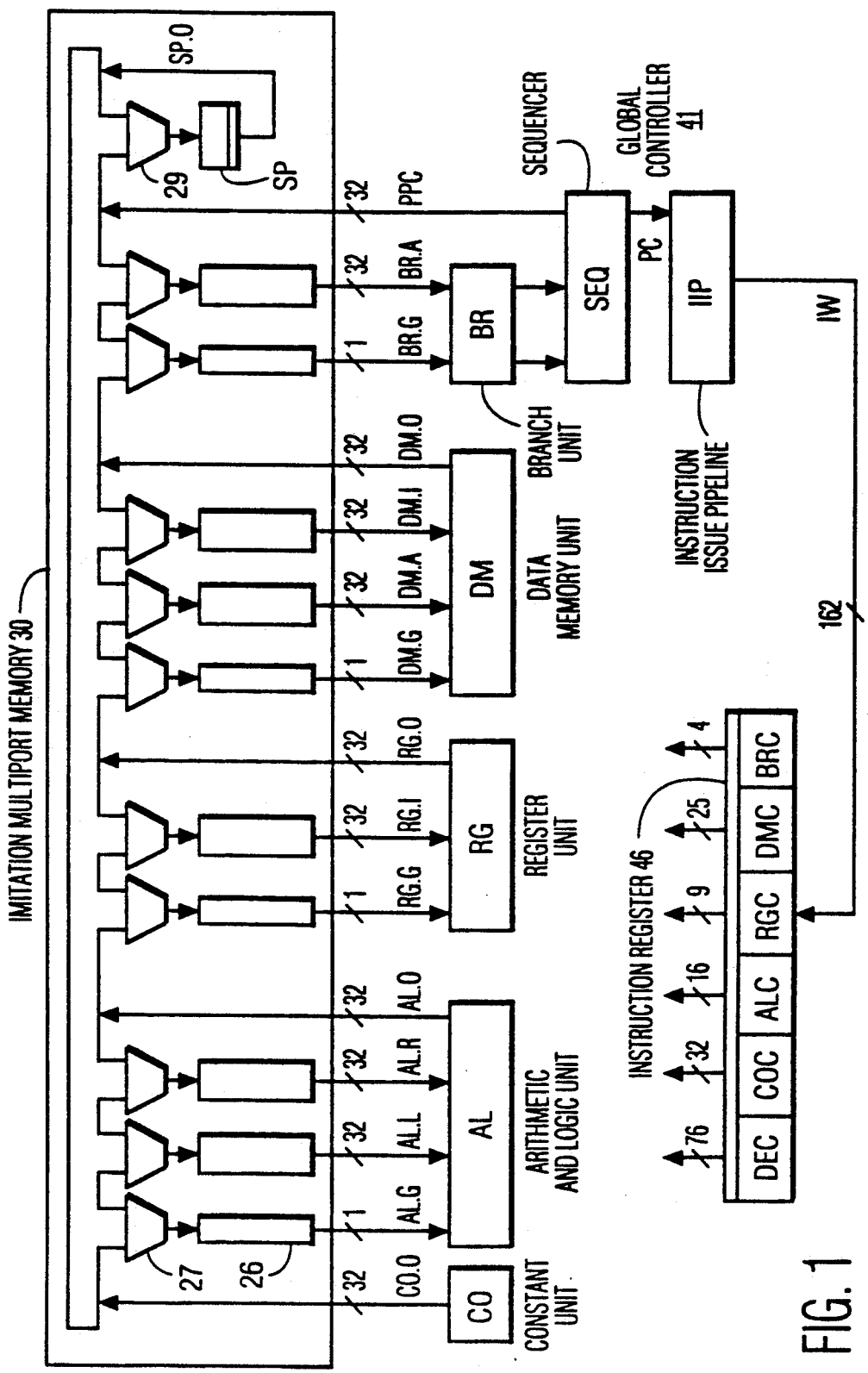
FIG. 1 shows in block schematic form a processing device in accordance with the present invention.

The processing device of FIG. 1 comprises an imitation multiport memory circuit 30 which is connected to five functional units including a Constant Unit CO, an Arithmetic and Logic Unit AL, a Register Unit RG, a Data Memory Unit DM and a Branch Unit BR. Within memory circuit 30 there are shown in schematic form memory units 26, multiplexers 27 and a Special Register SP with an associated multiplexer 29. The principles of operation of such a memory circuit and processor are described in the copending parent application No. 594,534 and in the reference by Slavenburg and Labrousse, both mentioned above. These principles form no part of the present invention and their description has been omitted in the present application, for the sake of brevity.

A Global Controller 41 is provided which comprises a Sequencer SEQ and an Instruction Issue Pipeline IIP. The Sequencer SEQ generates in each cycle a program counter word PC which is supplied to Instruction Issue Pipeline IIP. The Instruction Issue Pipeline IIP may be off-chip, and includes the program memory wherein the very long instruction words forming the program for execution are encoded. After a certain number of cycles delay, Instruction Issue Pipeline IIP feeds an on-chip Instruction Register 46 with a very long instruction word IW stored in the program memory at the address PC.

Figure 2:
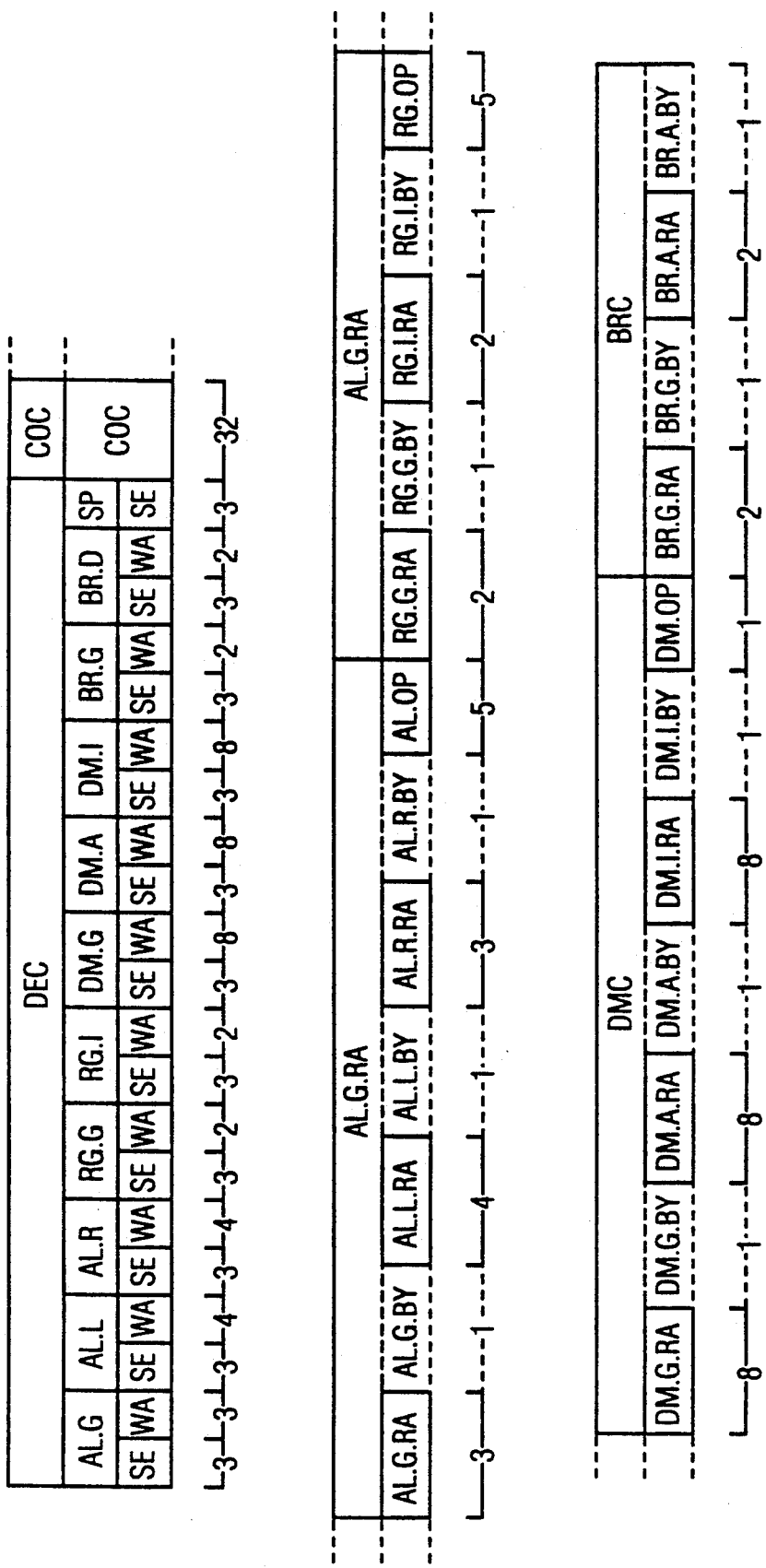
FIG. 2 shows the format of a very long instruction word in the device of FIG. 1.

The instruction word IW in register 46 comprises a Destination Control field DEC and a number of fields COC, ALC, RGC, DMC and BRC for controlling the individual functional units CO, AL, RG, DM and BR respectively. The total number of bits in instruction word IW is 162, although the processor described is a very simple example. FIG. 2 shows fields of the instruction word IW in more detail, with the number of bits in each field marked beneath that field.

Constant Unit CO has no operand inputs and one 32-bit result output (CO.O) connected to an input of memory circuit 30. Constant Unit CO in fact comprises a direct connection between the 32-bit field COC in instruction word IW (FIG. 2) and the output of Constant Unit CO. Constant Unit CO thereby enables constant values to be supplied from within the instruction word to the other units via the memory circuit 30.

Arithmetic and Logic Unit AL has a 1-bit guard value input (AL.G) and two (left and right) 32-bit argument inputs (AL.L and AL.R) connected to respective memory units within memory circuit 30. The unit AL has a 32-bit output (AL.O) connected back into memory circuit 30, and is controlled by a 16-bit field ALC of instruction word IW.

Figure 3:
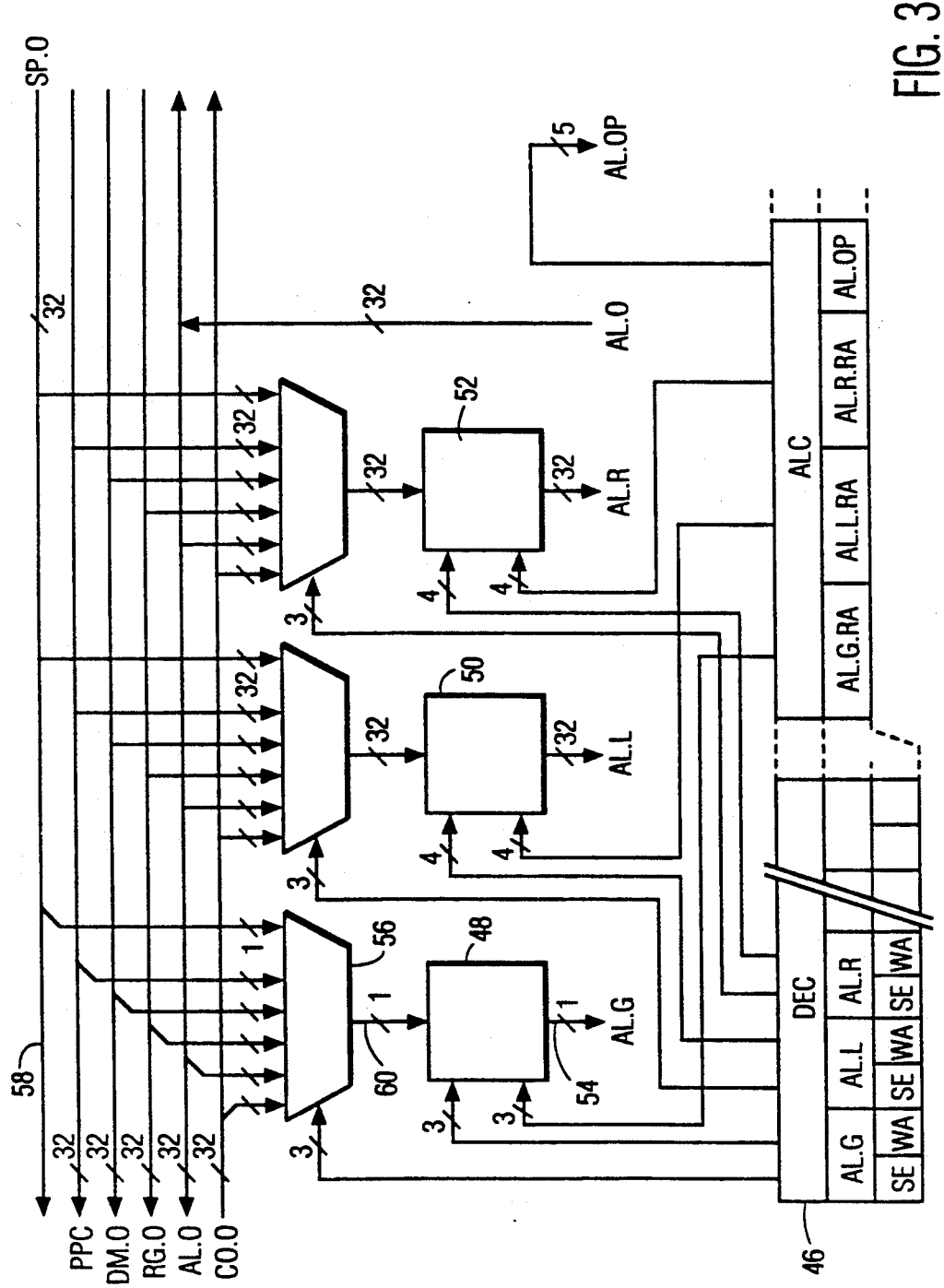
FIG. 3 shows a part of the imitation multiport memory in the device of FIG. 1.

FIG. 3 shows in detail the part of the imitation multiport memory circuit 30 associated with Arithmetic and Logic Unit AL. Within the memory circuit 30, separate memory units (RAM's) 48, 50 and 52 are associated with operands AL.G, AL.L and AL.R respectively. In contrast to some more conventional processing arrangements, no separate write enable signals are provided for the memory units in the device of FIGS. 1 to 9. Instead, at least one non-existent or at least non-writable storage location can be addressed when writing to that memory unit is not desired. The width of instruction word IW is reduced by the absence of the write enable bits, on the assumption that the value of these bits is already known at the time of scheduling, when results are allocated to specific memory unit locations.

The memory unit 48 for guard bit AL.G has eight 1-bit locations for storage of boolean values (bits), including one non-writable location as just described. A 3-bit read address for memory unit 48 is supplied by Instruction Register 46 from a 3-bit field AL.G.RA in control field ALC of instruction word IW (see FIG. 2), and a 1-bit read port 54 of the memory unit supplies a guard bit AL.G to unit AL from the addressed memory location.

A multiplexer 56 has a number of 1-bit inputs connected to the least significant bits (lsb's) of the 32-bit bus lines which are connected to the result outputs (CO.O, AL.O, etc.) of the various functional units. An additional input of the multiplexer is connected to the lsb of an additional 32-bit bus line 58, which carries a delayed result output SP.O from a delay element in the form of a Special Register SP. The provision and use of delay elements for resolving collisions in this type of VLIW processor forms the subject of the copending parent application No. 594,534 mentioned above. The use of the lsb for the guard bits affords compatibility with certain programming conventions, including for example those of the 'C' language. In other environments the most significant bit (msb) or some other bit might be a more convenient choice.

The multiplexer 56 has a 1-bit output 60 connected to a write port of memory unit 48. The multiplexer 56 is controlled by a 3-bit selection field AL.G.SE in the Destination Control field DEC of instruction word IW. A 3-bit write address for the L- write port of memory unit 48 is provided by the adjacent 3-bit field AL.G.WA in the Destination Control field DEC.

In a similar manner, 32-bit memory units 50 (for AL.L) and 52 (for AL.R) have associated 32-bit multiplexers 62 and 64 respectively. Each has 16 locations, including one non-writable location. Destination Control field DEC contains two 3-bit selection fields AL.L.SE and AL.R.SE for controlling multiplexers 62 and 64 and two 4-bit fields AL.L.WA and AL.R.WA providing 4-bit write port addresses for memory units 50 and 52 respectively. Two 4-bit fields AL.L.RA and AL.R.RA in control field ALC provide read addresses for the read ports of memory units 50 (for AL.L) and 52 (for AL.R) respectively.

An opcode AL.OP for Arithmetic and Logic Unit AL is provided by a 5-bit field in control field ALC for unit AL. In each cycle, opcode AL.OP determines what operation (add, subtract, compare, AND, OR, etc.) is to be performed on the arguments AL.L and AL.R to generate the result AL.O.

Returning to FIG. 1, Register Unit RG provides on-chip storage for sixteen frequently used program variables of 32 bits each. The unit RG has associated memory units within memory circuit 30 for a guard bit RG.G and a 32-bit data input RG.I. These memory units have only four locations each, including one non-writable location. A data output (RG.O) is connected to an input of memory circuit 30 wherein it forms a respective bus line (RG.O, see also FIG. 3). Destination Control field DEC contains two 3-bit selection fields RG.G.SE and RG.I.SE for controlling the associated multiplexers and two 2-bit write address fields RG.G.WA and RG.I.WA for selecting between the four locations in the respective memory units.

Within the 9-bit Register Unit control field RGC, two 2-bit read addresses RG.G.RA and RG.I.RA are provided for selecting the location of the values RG.G and RG.I to be read from their respective memory units. A 5-bit opcode field RG.OP contains one bit to select between register read and register write functions, and four bits to select between the sixteen registers within unit RG. The location of a variable within Register Unit RG is therefore fixed by the compiler.

Data Memory Unit DM contains, at least conceptually, a larger amount of storage for variables. Unit DM comprises in practice an interface to an off-chip bank of read/write memory. Within the imitation multiport memory circuit 30, separate memory units are provided for a guard bit DM.G, a 32-bit address word DM.A and a 32-bit input data word DM.I. These memory units have 256 locations each, including one non-writable location. Data Memory Unit DM has a 32-bit data output (DM.O) connected to an input of memory circuit 30 wherein it forms a respective bus line (DM.O, see also FIG. 3). Destination Control field DEC contains three 3-bit selection fields DM.G.SE, DM.A.SE and DM.I.SE for controlling multiplexers within memory circuit 30, and three 8-bit write address fields DM.G.WA, DM.A.WA and DM.I.WA for selecting between the 256 locations in each of the associated memory units.

Within the 25-bit Data Memory Unit control field DMC, three 8-bit read addresses DM.G.RA, DM.A.RA and DM.I.RA are provided for selecting the location of the values DM.G, DM.A and DM.I to be read from their respective memory units. A 1-bit opcode field DM.OP contains one bit to select between memory read and memory write functions (a 2-bit opcode would allow selection of no operation also). The address word DM.A defines the address for the writing of data word DM.I or the reading of data word DM.O. This allows the dynamic calculation of 32-bit addresses during running of programs, enough to address 2=locations.

Branch Unit BR allows the sequence of instruction addresses PC generated by Sequencer SEQ to be modified to cause branching in the program execution. The unit BR has associated memory units within memory circuit 30 for a guard bit BR.G and a 32-bit destination address BR.A. These memory units have four locations each including a non-writable location. Destination Control field DEC contains two 3-bit selection fields BR.G.SE and BR.A.SE for controlling the associated multiplexers and two 2-bit write address fields BR.G.WA and BR.A.WA for selecting between the four locations in the respective memory units.

Within the 4-bit Branch Unit control field BRC, two 2-bit read addresses BR.G.RA and BR.A.RA are provided for selecting the location of the values BR.G and BR.A to be read from their respective memory units. Branch Unit BR simply passes guard bit BR.G and destination address BR.A to the Sequencer SEQ. No opcode field BR.OP is required. Within Sequencer SEQ, the boolean value of guard bit BR.G is tested. If BR.G is TRUE, then a branch is to be implemented and Sequencer SEQ makes the next value of PC equal to destination address BR.A received from memory circuit 30. If BR.G is FALSE, then Sequencer SEQ merely increments the value of PC to PC+1, addressing the next instruction in the stored program.

Therefore, by directing a logic result AL.O to the memory unit for BR.G (lsb TRUE or FALSE), conditional branching can be effected. Unconditional (always or never) branching can be effected by directing a constant result CO.O to the memory unit for BR.G, or by arranging that non-writable locations in that memory unit are permanently TRUE or permanently FALSE. This is particularly convenient in the present embodiment, since at least one location in each memory unit is already non-writable, as described above. A guard bit BR.G=FALSE (branch never) will often be required when no branch operation is to be started in a given cycle.

Sequencer SEQ also produces a pseudo-program counter value PPC which is fed to an input of memory circuit 30 wherein it forms a bus line (PPC, see FIG. 3). The PPC can be used by other functional units, including Branch Unit BR, to implement program counter-relative addressing. For this purpose a read delay may be defined as the difference between the cycle number of an instruction reading a value PPC from the bus line into a memory unit and the cycle number of the instruction with PC equal to that value of PPC.

In operation, a branch delay of b cycles occurs between the cycle i in which a branch instruction is issued, and the first cycle i+b in which the instruction word IW(i+b) is affected by the branch instruction. The same boolean value which conditions the branch instruction can be directed to the guard bit inputs AL.G, RG.G, DM.G and BR.G and be used in the intervening cycles to conditionally inhibit state-changing operations scheduled for the various functional units during the branch delay, including further branches. Using knowledge of branching probabilities, the compiler is thereby enabled to schedule useful operations within the branch delay of an improbable conditional branch instruction, while ensuring a correct state in the minority of cases where the branch condition is met. To enable unguarded operations to be initiated most conveniently on these units, the non-writable location of each guard bit memory unit can be arranged to yield TRUE at their read ports in response to the appropriate read addresses .RA. The non-writable locations of the 32-bit operand memory units may also be arranged to yield some known, frequently required value, for example zero.

Only the contents of the off chip memory, the registers of Register Unit RG and the program counter PC are considered part of the programmer-visible state of the processing device in the present embodiment. The imitation multiport memory circuit 30 is used by the compiler as a buffer for intermediate variables on a strictly temporary basis. Consequently, functional units such as Constant Unit CO do not require guarding. Arithmetic and Logic Unit AL is provided with guarding to avoid exceptions such as arithmetic overflows arising spuriously, even though unit AL cannot itself alter the programmer-visible state of the device.

In addition to the branch delay of Branch Unit BR, the scheduling compiler must have knowledge of the so-called 'latency' of every functional unit. The latency of a functional unit is defined as the difference between the number of the cycle in which an operation is started and the number of the cycle in which the result (AL.O etc.) of that operation is produced and directed by Destination Control field DEC to the desired location(s) in the imitation multiport memory circuit 30. The branch delay mentioned above may be considered as the sum of the latency due to Branch Unit BR and a latency due to Sequencer SEQ and the off-chip Instruction Issue Pipeline IIP.

For the purpose of the following programming example, it is assumed that the latencies for the functional units are as follows:

Unit CO—zero cycles latency;
Unit AL—1 cycle latency;
Unit RG—1 cycle latency;
Unit DM—2 cycles latency; and
Unit BR—5 cycles branch delay.

Figure 4:
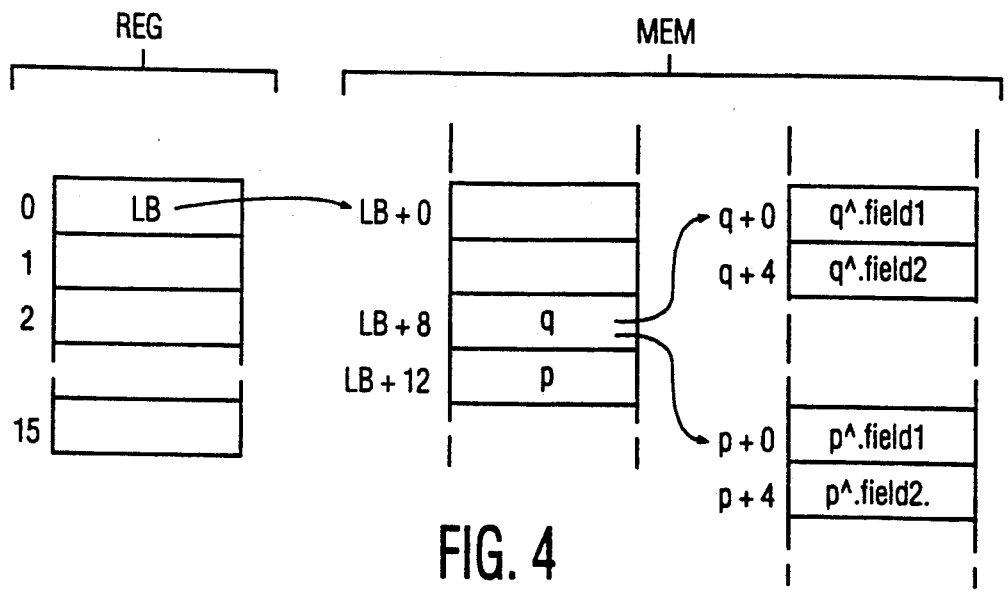
FIG. 4 illustrates the operation of a first example program fragment.

Listing 1 below comprises a fragment of high level language source code. Two records in memory are pointed to by variables p and q. The aim of the program is to cause copying of two 32-bit values from fields in the q record to two corresponding fields in the p record.
Listing 1
 p^.field1:=q^.field1;
 p^.field2:=q^.field2;

FIG. 4 illustrates one possible organization of data that might be used to implement the high level instructions of Listing 1. Storage for program variables is provided by a high-speed register file REG, having sixteen locations numbered 0 to 15, and a larger bank MEM of (off-chip) read/write memory. A Local Base address LB is stored in location 0 of register file REG. The address LB points to the start of a table of variable values in memory bank MEM, wherein the two record pointers p and q are stored at locations LB+12 and LB+8 respectively. Each variable p and q is a pointer to the start of the corresponding record, located elsewhere in memory bank MEM. The first field of each record is stored at an offset of zero from the address defined by the relevant pointer variable. The second field of each record is stored at an offset of four from the relevant pointer variable. Thus the value q^.field2 can be read from the location whose address is q+4.

Listing 2 shows an intermediate code fragment, labelled T1, that might be generated by a compiler to execute the high level instructions of Listing 1 on a VLIW processor, assuming the data organization described above with reference to FIG. 4. Each line of Listing 2 defines a single primitive operation Op001 to Op014 to be scheduled for execution by a suitable functional unit. A comment (* . . . *) at the end of each line first mentions the type of functional unit required (AL, RG, CO etc.) and then describes the result (output) of that operation. The references 001 and 002 in operation Op003 (for example) indicate that the operands for Op003 are the results of Op001 and Op002 respectively. Thus the effect of operation Op003 is to add the results of operations Op001 and Op002, while the effect of operation Op009 is to write the result of Op008 into the off-chip data memory at a location addressed by the result of Op004. Combining this information with the description of FIG. 4 above, the purpose of each operation Op001 to Op014 in Listing 2 in implementing the function specified by Listing 1 should be self explanatory.

```
                   Listing 2
T1:
Op001    rdreg(0);          (* RG, Local Base address *)
Op002    constant(12);      (* CO, offset value for p *)
Op003    aplus 001 002;     (* AL, address of p *)
Op004    read 003;          (* DM, p *)
Op005    constant(8);       (* CO, offset value for q *)
Op006    aplus 001 005;     (* AL, address of q *)
Op007    read 006;          (* DM, q *)
Op008    read 007;          (* DM, q^ .field1 *)
Op009    write 004 008;     (* DM, p^ .field1 := q^ .field1 *)
Op010    constant(4);       (* CO, offset for field2 *)
Op011    aplus 004 010;     (* AL, address of p^ .field2 *)
Op012    aplus 007 010;     (* AL, address of q^ .field2 *)
Op013    read 012;          (* DM, q^ .field2 *)
Op014    write 011 013;     (* DM, p^ .field2 := q^ .field2 *)
GOTO EXIT
```

It will be appreciated that the intermediate code fragment T1 is listed in a sequential form, not specific to any particular configuration of VLIW processor, provided that at least one functional unit is suitable to perform each operation. Once the compiler has arrived at the collection of such fragments that make up an application program, it is the task of a scheduler to map each operation of the fragment to a particular functional unit in a particular cycle in a particular device configuration, so that the operations are executed in a parallel fashion. The scheduler operates with a set of constraints defined by the structure of the particular VLIW processor. These constraints include primarily the number and type of functional units available in the target VLIW processor, and the latency of each functional unit. Other constraints include the number of locations in each memory unit of the imitation multiport memory. These locations are allocated dynamically by the scheduler as required. For the purpose of the simple scheduling problem presented by the fragment T1, it will be seen that the number of locations in each memory unit in the VLIW processing device of FIGS. 1 to 4 is sufficient that the limited capacity of the memory units need not be considered as a constraint in the present description.

The latency for each operation is important because operations dependent on the results of other operations must not be scheduled until the latencies of all those other operations have expired. Thus, for example, operation Op009 must be scheduled at least 2 cycles later than Op004 (DM latency is 2) and at least 2 cycles later than Op008. Similarly, operation Op011 can be scheduled in the same cycle as Op010 (CO latency is zero), but must be at least 2 cycles later than Op004 (DM latency is 2). This assumes that simultaneous write and read of a memory unit location is possible. Otherwise a further one cycle latency may be needed for each type of operation. To enable this simultaneous write and read access to each memory unit location, bypass features are included in each memory unit as described below, with reference to FIG. 6 or FIG. 7.

FIG. 5 shows three different schedules (I, II and III), each mapping the intermediate code fragment T1 onto the specific VLIW processor described above with reference to FIGS. 1 to 4. Each row of each table represents one very long instruction word IW, and hence one machine cycle. Cycle numbers are given in the left most column, headed Cy. The next five columns represent the five control fields COC, ALC, RGC, DMC and BRC for the five functional units (CO etc. in FIG. 1). Each control field begins an operation on its respective functional unit. Thus in Schedule I, Cycle 0, field COC instructs Constant Unit (CO in FIG. 1) to begin Op005, so that result CO.O=8 appears at the output of unit CO in the same cycle (CO latency is zero). Similarly, the register reading operation Op001 is initiated in Cycle 0 by field RGC. The value LB of the Local Base address is thus RG.O in Cycle 1 (RG latency is 1).

The selection fields DEC.--.-.SE of Destination Control field DEC in each instruction are represented to the right of the functional unit control fields. These fields direct the results of the various operations Op001-Op014 into respective memory units as such results become available. The scheduler takes account of the latencies of the various functional units in defining Destination Control field DEC. Thus, for example, result RG.O of register reading operation Op001, started by field RGC in Cycle 0, is directed to the left operand memory unit of Arithmetic and Logic Unit AL by field DEC.AL.L.SE in the following instruction, Cycle 1. This is indicated by the code RG in the AL.L column in Schedule I, Cycle 1. Similarly, memory reading operation Op007 is started by field DMC in Cycle 2, while result DM.O of that operation is directed to the address memory unit of Data Memory Unit DM by setting field DEC.DM.A.SE to 'DM' in Cycle 4 (DM latency is 2).

The scheduler adds its own operations Nw015 and Nw016 to effect a jump to the next fragment ('GOTO EXIT' in Listing 2). Nw015 uses Constant Unit CO in Cycle 1 to define the target address for the branch, which is directed to the address memory unit of Branch Unit BR by setting selection field DEC.BR.A.SE to 'CO' in Cycle 1. Nw016 uses branch control field BRC, also in Cycle 1, to initiate an unconditional (BR.G=1) branch to the target address. The long branch delay of 5 cycles ensures that transfer of control to the target address does not occur until Cycle 8, after fragment T1 has completed. In other words, the branch operation has been brought forward in the schedule so that useful operations can be scheduled for execution during the branch delay. It may be noted that only about one third of the potential maximum number of operations are actually scheduled in FIG. 5, Schedule I. This is due to the very small size of the example fragment, and it will be understood by those skilled in the art that a higher proportion of useful operations can be scheduled when scheduling a longer fragment, because of the higher degree of parallelism inherent in longer fragments.

The large number of conditional branching operations inherent in longer fragments is overcome in the processing device described by use of the boolean-valued guard bits .G, exploiting the fact that most conditional branches can be arranged to have a branch probability close to one or close to zero. For example, a loop to be executed 100 times will involve a branch which can be predicted to occur with a probability of 0.99 or 0.01.

The Schedule I in FIG. 5 could have been executed by a VLIW machine having a true multiport memory, ignoring the Destination Control field DEC altogether. However, Schedule I contains a collision for access to a memory unit of the imitation multiport memory, and is thus not a valid mapping of operations Op001–Op014 onto the processor of FIGS. 1 to 4. In Cycle 5 of Schedule I, result DM.O of Op004 is destined for the left operand memory unit (AL.L) of Arithmetic and Logic Unit AL and for the address memory unit (DM.A) of Data Memory Unit DM. In the same Cycle 4, result AL.O of Op012 is also destined for the address memory unit (DM.A) of Data Memory Unit DM. This collision is marked by the code XX in field DEC.DM.A.SE in Cycle 5, Schedule I.

In the absence of the delay element (Special Register SP), the scheduler would be forced to reschedule these operations when it discovered the collision, until the constraints of the processor hardware are satisfied. In the present example, this might lead to Schedule II of FIG. 5. In Schedule II, Op004 has been delayed by one cycle, to start in Cycle 4. Dependent on the result of Op004, however, are operations Op009, Op011, and Op014, which must therefore also be delayed by at least one cycle. These operations were interleaved in Schedule I with other operations Op012, Op008, constraints of the hardware.

This process of rescheduling, or 'backtracking', can always be completed to satisfy the hardware constraints, but the rescheduled fragment T1 now occupies 9 cycles instead of 8. This means that this part of the application program takes 12.5% longer than it would in an ideal VLIW machine having the same functional units. Furthermore, backtracking involves the compiler in extra work, including the resolution of fresh collisions that arise in resolving the first collision. The problem of increased compiler effort becomes especially acute in larger machines, where a collision might occur almost every cycle. It will be apparent that the existence of a collision is not generally detected until several instructions have been scheduled beyond the cycle in which the collision occurred. In a large machine of ten or more functional units, this will necessitate the rescheduling of tens or even hundreds of operations, with the potential for new collisions to arise just as frequently during the rescheduling.

FIG. 5, Schedule III represents the resolution of the example collision without backtracking, using the delay element in the form of Special Register SP, as described more fully in the copending parent application No. 594,534. The selection field DEC.SP.SE in Destination Control field DEC is shown at the right in Schedule III. It will be seen that the scheduling of operations Op001–Op014 and Nw015–Nw016 is almost identical to that of Schedule I (true multiport memory). In Schedule III, however, the collision in Cycle 5 between the two results destined for the DM.A memory unit is resolved by directing the result DM.O of Op004 in to the Special Register, that is by setting field DEC.SP.SE to 'DM' in Destination Control field DEC. The field DEC.DM.A.SE is then set to 'SP' in Cycle 6 to direct the delayed result of Op004 to the DM.A memory unit in time for it to be read by Data Memory Unit DM in Op009, Cycle 6.

The delayed result of Op004 now collides in Cycle 6 with the result of Op011, both being destined for the DM.A memory unit. In Schedule III, the start of Op011 has therefore been delayed to Cycle 6, with no consequential effect on any other operations. An alternative solution to this second collision would have been to leave Op011 in Cycle 5, while delaying the result of Op011 by setting field DEC.SP.SE to 'AL' in Cycle 6. The delayed result of Op011 could then have been directed to the DM.A memory unit in time for the start of Op014 by setting field DEC.DM.A.SE to 'SP' in Cycle 7.

Special Register SP is therefore effective to maintain the performance level of a true multiport machine while avoiding backtracking, so long as only a single, two-value collision arises in any given cycle. The provision and use of a delay elements for this purpose is the subject of the copending parent application No. 594,534, and is described more fully therein.

As noted above, each memory unit 26 of the imitation multiport memory circuit 30 includes bypass circuitry to allow a value to be written to a storage location and read from the same storage location in a single cycle. In accordance with the present invention, the bypass function is controlled directly by the program instruction word IW, as will now be described with reference to a first embodiment of FIG. 6 and a second embodiment of FIG. 7.

Figure 6:
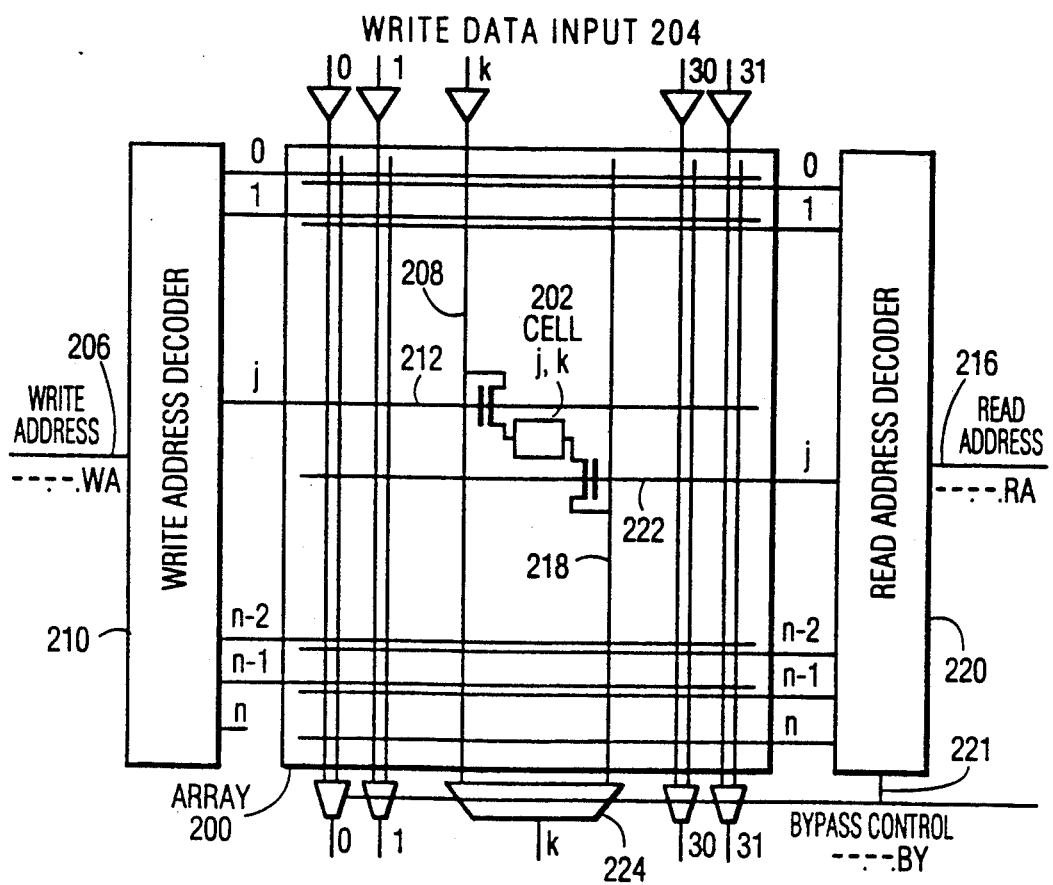
FIG. 6 shows a first embodiment of a two-port memory for use in the processing device of FIG. 1.

FIG. 6 shows the structure of a memory unit having n+1 32-bit storage locations, addressed 0 to n, with the bits of each location being numbered 0 to 31. An array 200 of 32(n+1) storage cells includes a representative cell 202, for location j, bit k. Internally, each cell is in this embodiment a simple static memory cell of a type well-known to those skilled in the art. A suitable structure for each cell of the array is described for example by Shuster in U.S. Pat. No. 4,599,708, it being understood that each word and bit line mentioned in the following description comprises in practice a complementary pair of lines and is shown as a single line for the sake of clarity. The adaptation required to implement the 1-bit guard memory units, or any other width of memory unit, will be immediately apparent to the skilled reader.

The memory unit has a write port, comprising a 32-bit write data input 204 and a write address input 206 (.WA) having a number of bits appropriate to the number (n+1) of addressable locations (for example 8 bits are sufficient to address 256 locations). The bits 0–31 of the write data input 204 are buffered to form write bit lines in the array 200 (referenced 208 for bit k). The write address --.-.WA is received by a write address decoder 210 whose outputs 0 to form write word lines in the array 200 (212 for location j). A write word line is not provided for location n, so that this location may be used by the scheduler as the non-writable location as described in detail above. The cells 0–31 of location n are then advantageously formed by read-only cells, and not static RAM cells.

The memory unit has a read port, comprising a 32-bit read data output 214 and a read address input 216 (.RA) having a number of bits appropriate to the number (n+1) of addressable locations (for example 8 bits are sufficient to address 256 locations). There are read bit lines in the array 200 for bits 0–31 (218 for bit k). The read address --.-.RA is received by a read address decoder 220 whose outputs 0–n form read word lines in the array 200 (222 for location j).

Bypass circuitry comprises a row of 32 multiplexers (224 for bit k), each having first and second inputs connected to the write bit line and the read bit line respectively for its associated bit (respectively 208 and 218 for bit k). The outputs of the multiplexers form the read data output 214 of the memory unit. The selection inputs of the multiplexers all receive a bypass control signal --.-.BY. When --.-.BY=0, read data output 214 is connected to the read bit lines 218 etc. of the array. When --.-.BY=1, the read data output 214 is connected to the buffered write data bit lines 208 etc.. The bypass control signal --.-.BY is also received at an inhibit input 221 of read address decoder 220.

In the operation of the write port, when the write address --.-.WA indicates location j, the word line 212 is activated which causes the value on the write bit line 208 to be entered into the storage cell 202. In the operation of the read port, when the read address --.-.RA indicates location j, the word line 222 is activated which causes the value in storage cell 202 to appear on read bit line 218.

In this manner, write and read operations can be performed simultaneously in each cycle at addresses --.-.WA and --.-.RA respectively specified in the instruction word IW (see FIGS. 2 and 3). However, the simple cell structure does not permit simultaneous access to cell j,k from write bit line 208 and read bit line 218 in the same cycle. In the event that simultaneous access to location j (for example) is required, the bypass signal --.-.BY=1 acts within decoder 220 to inhibit the assertion of the read word line 222, while the value on the write bit line 208 is passed directly to the read data output 214 by the multiplexer 224 and is written into the storage cell 202 for retrieval in a later cycle, if desired.

Whereas, in the conventional bypass arrangements of Shuster and Garde, the bypass signal --.-.BY is generated by detecting equality of the addresses as they are received, in the present arrangement the equality is detected by the scheduler when the program is being compiled. A bypass signal --.-.BY for every read port of the imitation multiport memory is encoded explicitly in the instruction word IW, as shown dotted in FIG. 3.

Several occasions for bypassing can be seen in the example schedule III of FIG. 5. In cycle 2 (Cy=2), for example, the result of operation Op002 is simultaneously produced by Constant Unit CO as CO.O and received by Arithmetic and Logic Unit AL as operand AL.R for operation Op003. For this purpose, the associated bypass control field AL.R.BY is set in cycle 2.

Clearly the bypass control bits --.-.BY constitute an unfortunate extra contribution to the length of the instruction word IW. This can be avoided at little cost, however, as illustrated by the second embodiment of the invention, shown in FIG. 7.

Figure 7:
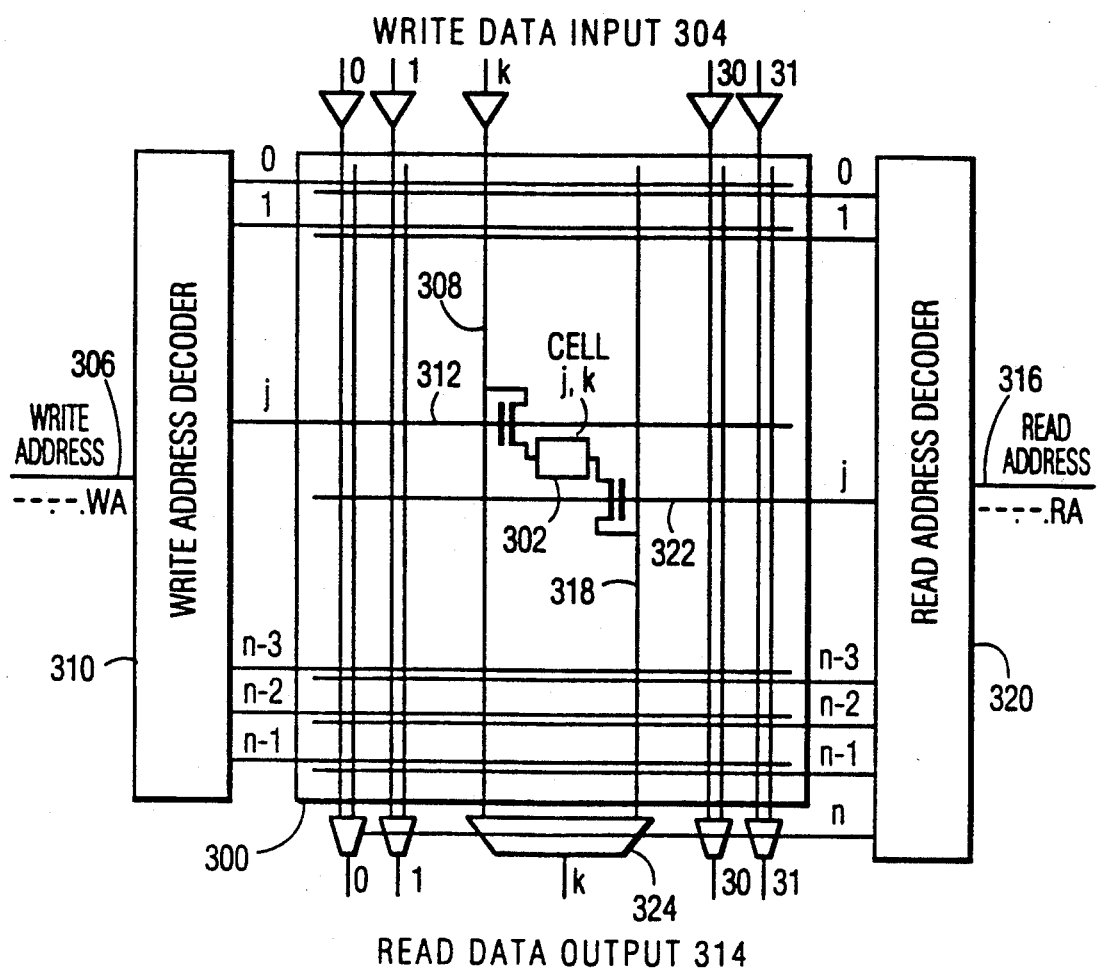
FIG. 7 shows a second embodiment of a two-port memory for use in the processing device of FIG. 1.

In FIG. 7, the memory unit of the second embodiment has features 300 to 324 corresponding to the like-numbered features 200 to 224 of the first embodiment (FIG. 6). In the second embodiment, however, there is no location n in the array 300, there is no separate bypass control signal --.-.BY and there is no inhibit input to the read address decoder 320. Instead, the multiplexers are controlled by the n output of decoder 320. In the instruction words for controlling the second embodiment, bypass is selected by the special read address value --.-.RA=n. In cycle 2 of Schedule III, for example, field AL.R.WA=j would cause the result CO.O of operation Op002 to be stored at location j in the array 300, while AL.R.RA=n would activate the bypass multiplexers 324 etc. to make the same result CO.O available simultaneously at the AL.R read port of the imitation multiport memory circuit 30.

Although one location is lost from each memory unit, the ten extra bits --.-.BY have been eliminated in the instruction word IW. The loss of a location is particularly insignificant since write address --.-.WA=n can still be used for the non-writable location which was present already.

Those skilled in the art will readily appreciate that principles embodied in the memory units described can be extended in memory units having more than one write port and/or more than one read port, for example by an arrangement of multiple multiplexers similar to that described by Garde in U.S. Pat. No. 4,811,296, each such multiplexer being controlled by a bypass signal explicitly encoded in the program instructions. This software controlled bypass technique could also be applied in the register file contained in Register Unit RG, if simultaneous write and read access were desired there, and similarly to register files in a wide range of different processing devices. The only restriction is that the equality of the port addresses must be known in advance, when the instruction words are being compiled.

We claim:

1. A data processing device structured for operation under control of a sequence of instructions forming a program, the device including:
   (a) storage means including a plurality of storage locations each having their own address and having at least first and second data ports for providing parallel access to storage locations at different addresses in accordance with respective first and second addresses encoded in a first type of program instruction,
   (b) said sequence of instructions including a second type of program instruction which includes an explicitly encoded bypass signal to simulate parallel access of both data ports to a storage location at the same address,
   (c) bypass means responsive to said bypass signal upon execution of said second type of program instruction for connecting the second data port to the first data port to avoid simultaneous parallel access by both data ports to the storage location at the same address.

2. A processing device as claimed in claim 1 wherein the first data port is a write port of the storage means and the second data port is a read port of the storage means.

3. A processing device as claimed in claim 1 wherein the bypass signal is encoded separately from the first and second addresses, in a bypass control field contained in each program instruction of the first or second type.

4. A processing device as claimed in claim 1 wherein in the second type of program instruction the bypass signal is encoded as a special value in a field which in an instruction of the first type contains one of the first and second addresses.

5. A processing device as claimed in claim 2 wherein the bypass signal is encoded separately from the first and second addresses, in a bypass control field contained in each program instruction of the first or second type.

6. A processing device as claimed in claim 2 wherein in the second type of program instruction the bypass signal is encoded as a special value in a field which in an instruction of the first type contains one of the first and second addresses.

7. A processing device as claimed in claim 6 wherein the bypass signal is encoded as a special value of a field which in an instruction of the first type contains the second address.

8. A processing device as claimed in claim 2 further including:
- a processing element having a data input and a data output and being constructed to operate synchronously with the storage means under control of the instructions, wherein the storage means forms a register file for buffering intermediate results between the data output and the data input of the processing element.

9. A processing device as claimed in claim 8 wherein the processing element is one of a plurality of processing elements constructed to operate synchronously with one another under control of respective fields of the program instructions, and wherein the storage means forms at least part of a multiport register file interconnecting respective data inputs and data outputs of at least two of the processing elements.

10. A processing device as claimed in claim 8 wherein the bypass signal is encoded separately from the first and second addresses, in a bypass control field contained in each program instruction of the first or second type.

11. A processing device as claimed in claim 8 wherein the second type of program instruction the bypass signal is encoded as a special value in a field which in an instruction of the first type contains one of the first and second addresses.

12. A processing device as claimed in claim 11 wherein the bypass signal is encoded as a special value of a field which in an instruction of the first type contains the second address.

13. A method of operating a processing device constructed in accordance with claim 1, the method comprising:
- defining a desired sequence of operations for the device, including parallel first and second sequences of accesses to locations in the storage means via the first and second data ports respectively;
- identifying in the first and second access sequences desired parallel accesses to the same location; and
- generating a sequence of instructions for controlling the operation of the device to effect the first and second access sequences, the generated sequence including instructions of the second type to effect the identified parallel accesses.

14. A method of operating a processing device constructed in accordance with claim 8, the method comprising:
- defining a desired sequence of operations for the device, including parallel first and second sequences of accesses to locations in the storage means via the first and second data ports respectively;
- identifying in the first and second access sequences desired parallel accesses to the same location; and
- generating a sequence of instructions for controlling the operation of the device to effect the first and second access sequences, the generated sequence including instructions of the second type to effect the identified parallel accesses.

15. A method of operating a processing device constructed in accordance with claim 11, the method comprising:
- defining a desired sequence of operations for the device, including parallel first and second sequences of accesses to locations in the storage means via the first and second data ports respectively;
- identifying in the first and second access sequences desired parallel accesses to the same location; and
- generating a sequence of instructions for controlling the operation of the device to effect the first and second access sequences, the generated sequence including instructions of the second type to effect the identified parallel accesses.

16. A method of operating a processing device constructed in accordance with claim 12, the method comprising:
- defining a desired sequence of operations for the device, including parallel first and second sequences of accesses to locations in the storage means via the first and second data ports respectively;
- identifying in the first and second access sequences desired parallel accesses to the same location; and
- generating a sequence of instructions for controlling the operation of the device to effect the first and second access sequences, the generated sequence including instructions of the second type to effect the identified parallel accesses.

17. A multiport memory circuit comprising:
(a) an array of data storage locations associated with respective different address values,
(b) first and second data ports for writing data to and reading data from said first and second data ports,
(c) address decoding means for receiving respective first and second address values and for enabling parallel access via the first and second data ports to respective data storage locations in accordance with received address values,
(d) bypass means for connected the second data port to the first data port to avoid accessing any data storage locations in response to the decoding means receiving a predetermined value of at least one of the received addresses, said predetermined value being different from the address values associated with any of the data storage locations in the array and not being capable of addressing any of such data storage locations, so as to simulate parallel access of both data ports to a storage location at the same address.

18. A memory circuit as claimed in claim 17 wherein the first data port is a write port of the storage means and the second data port is a read port of the storage means.

19. A memory circuit as claimed in claim 18 wherein the bypass means is responsive to a special value of the second address.

* * * * *